(12) United States Patent
Hasebe et al.

(10) Patent No.: US 7,331,603 B2
(45) Date of Patent: Feb. 19, 2008

(54) AIRBAG AND AIRBAG DEVICE

(75) Inventors: Masahiro Hasebe, Hikone (JP); Youko Kitagawa, Hikone (JP); Yukitoshi Narimoto, Omihachiman (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/586,503

(22) Filed: Oct. 26, 2006

(65) Prior Publication Data
US 2007/0040367 A1  Feb. 22, 2007

Related U.S. Application Data

(62) Division of application No. 10/705,833, filed on Nov. 13, 2003, now Pat. No. 7,128,335.

(30) Foreign Application Priority Data
Mar. 17, 2003  (JP) ............................... 2003-72118

(51) Int. Cl.
*B60R 21/16* (2006.01)

(52) U.S. Cl. .................... 280/731; 280/735; 280/742
(58) Field of Classification Search ............ 280/730.1, 280/731, 732, 735, 736, 742
See application file for complete search history.

(56) References Cited

U.S. PATENT DOCUMENTS

| 4,805,930 A | * | 2/1989 | Takada ................... 280/739 |
| 6,209,908 B1 | * | 4/2001 | Zumpano ................ 280/729 |
| 6,241,279 B1 | * | 6/2001 | Ochiai .................. 280/735 |
| 6,431,591 B1 | * | 8/2002 | Ray et al. .............. 280/735 |
| 6,513,829 B1 | * | 2/2003 | Zumpano ............... 280/730.1 |
| 6,811,182 B2 | * | 11/2004 | Kobayashi et al. ......... 280/735 |

* cited by examiner

*Primary Examiner*—Paul N. Dickson
*Assistant Examiner*—Toan C. To
(74) *Attorney, Agent, or Firm*—Manabu Kanesaka

(57) ABSTRACT

An airbag includes a bag portion, a pressure sensor for detecting an inner pressure of the bag portion when the airbag is inflated, and a harness electrically connected to the pressure sensor. The harness has a portion disposed on an inner surface of the bag portion along a folding line for folding the bag portion.

6 Claims, 4 Drawing Sheets

AIRBAG AND AIRBAG DEVICE

CROSS-REFERENCE TO RELATED APPLICATION

This is a divisional application of patent application Ser. No. 10/705,833 filed on Nov. 13, 2003 now U.S. Pat. No. 7,128,335.

BACKGROUND OF THE INVENTION AND RELATED ART STATEMENT

The present invention relates to an airbag and an airbag device installed in, for example, a vehicle. More specifically, the present invention relates to an airbag and an airbag device having a sensor for detecting an internal pressure of the airbag.

An airbag device installed in an automobile comprises an airbag and a gas generator for inflating the airbag. In case of automobile collision, the gas generator ejects gas and the airbag is inflated to receive and protect an occupant.

Japanese Patent Publication (KOKAI) No. 09-30367 has disclosed an airbag in which a pressure sensor detects an internal pressure of the airbag in order to monitor a state of inflation of the airbag. The pressure sensor is installed at a filter for filtering gas from a gas generator. When the airbag is inflated, the gas from the gas generator passes the filter at a high speed toward an inside of the airbag. Therefore, when the pressure sensor is installed at the filter, it is difficult to accurately detect the pressure due to Karman's vortex and Venturi action caused by the gas flow.

Accordingly, it is an object of the present invention to provide an airbag having a pressure sensor for detecting the internal pressure of the airbag with high precision, and an airbag device comprising the airbag.

Further objects and advantages of the invention will be apparent from the following description of the invention.

SUMMARY OF THE INVENTION

According to the present invention, an airbag comprises a bag portion to be inflated at a location close to an occupant and a pressure sensor mounted on an inner surface of the bag portion. An airbag device comprises the airbag and a gas generator for inflating the airbag.

In the airbag and airbag device of the invention, the pressure sensor is disposed on the inner surface of the bag portion. Accordingly, high-speed air flow from the gas generator does not affect the pressure sensor, and it is possible to detect the pressure with high precision.

According to the present invention, it is desirable to provide a harness connected to the pressure sensor and routed along the inner surface of the bag portion. With this arrangement, the harness does not interfere when the airbag is folded, thereby making it easy to fold the airbag. Further, when the airbag is inflated, the harness moves with the airbag, thereby preventing excessive stress from exerting upon a localized portion of the harness.

According to the present invention, at least a portion of the harness is routed along the folding portion of the airbag. In general, a slight gap is formed along a folding line of the airbag. At least a part of the harness is disposed in the gap, so that the airbag does not become bulky when the airbag is folded.

According to the present invention, it is desirable to dispose the pressure sensor at a portion of the airbag other than that where the airbag contacts the occupant or a vehicle body. With this arrangement, when the airbag contacts the occupant or the vehicle body, it is possible to eliminate shock, vibration, pressure, or the like applied to the pressure sensor, thereby preventing damage on the pressure sensor and a variation in detecting the pressure.

BRIEF DESCRIPTION OF THE DRAWINGS

FIGS. 3(a) and 3(b) are views showing an operation of the airbag device, wherein FIG. 3(a) shows an inside of a vehicle before the airbag is inflated, and FIG. 3(b) shows the inside of the vehicle when the airbag is inflated;

DETAILED DESCRIPTION OF PREFERRED EMBODIMENTS

Figure 1:
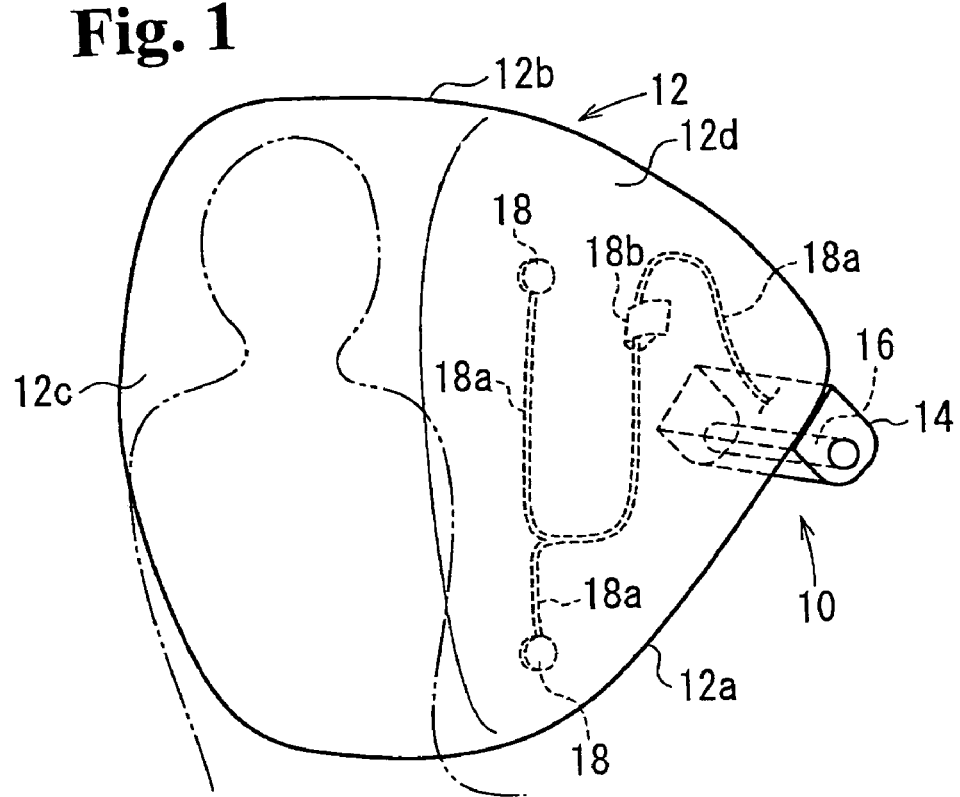
FIG. 1 is a perspective view of an airbag device when an airbag is inflated according to an embodiment of the present invention.
Figure 2:
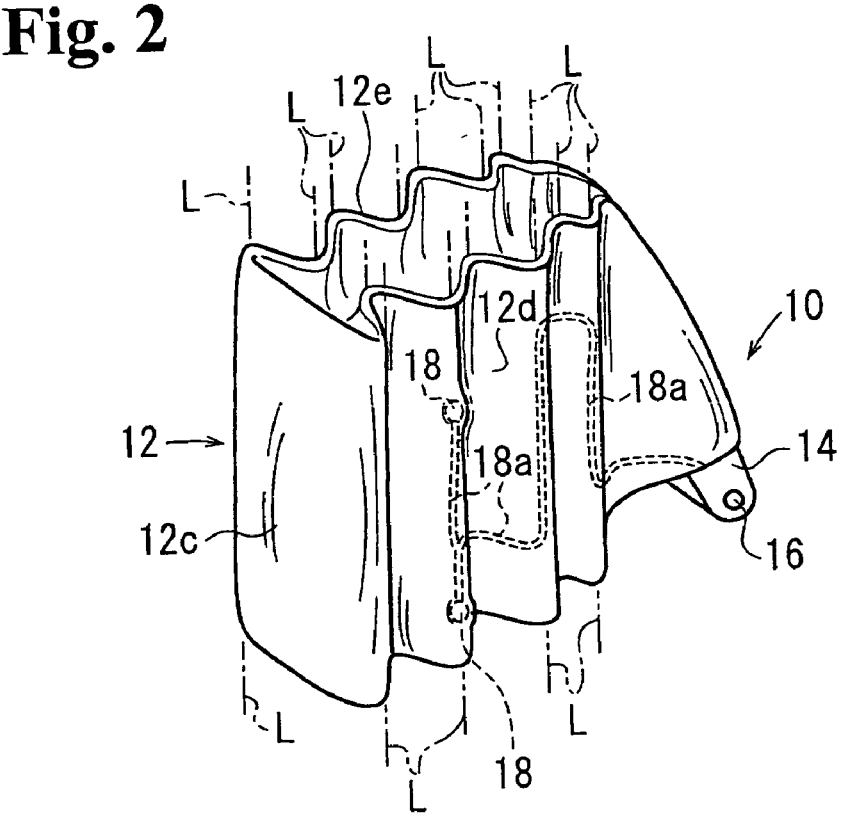
FIG. 2 is a perspective view of the airbag in a folded state.
Figure 3A:
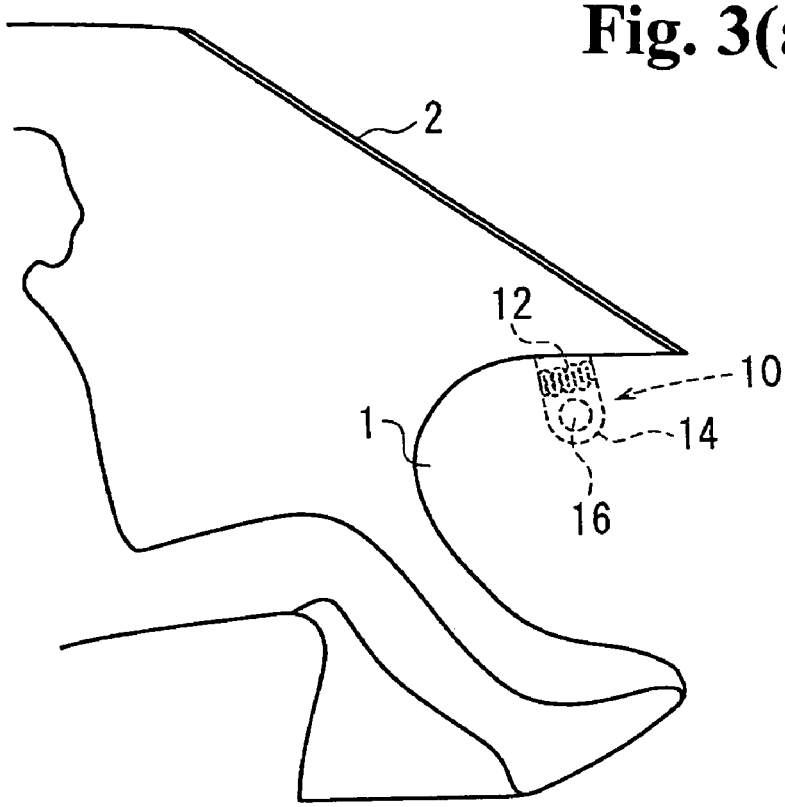
Figure 3B:
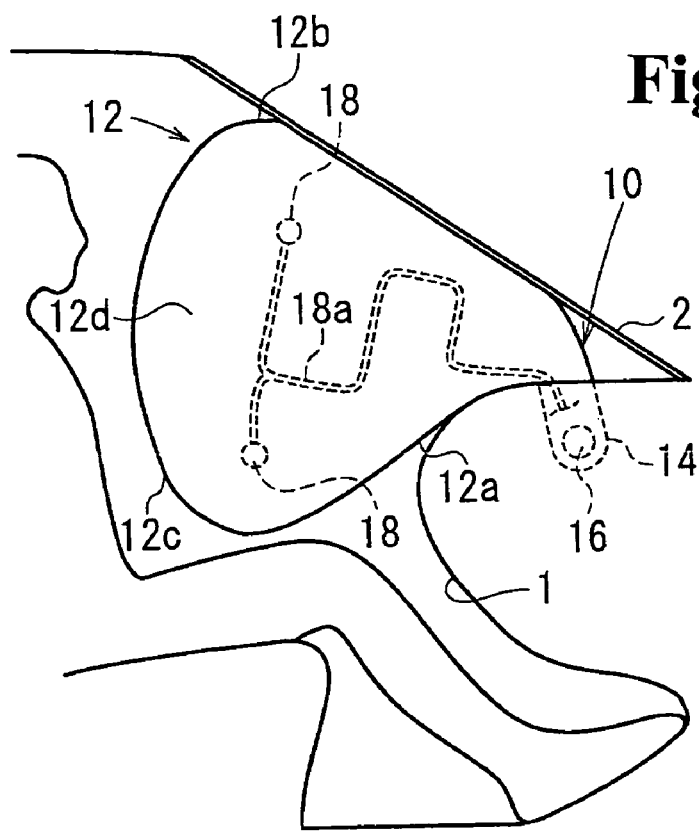

Hereunder, embodiments of the present invention will be explained with reference to the accompanying drawings. FIG. 1 is a perspective view of an airbag device when an airbag is inflated according to an embodiment of the present invention. FIG. 2 is a perspective view of the airbag in a folded state. FIGS. 3(a) and 3(b) are views showing an operation of the airbag device, wherein FIG. 3(a) shows an inside of a vehicle before the airbag is inflated, and FIG. 3(b) shows the inside of the vehicle when the airbag is inflated.

As shown in FIG. 3(a), a passenger airbag device 10 is disposed in an airbag device installation opening (not shown) formed in a top surface of an instrument panel 1. The airbag device 10 comprises an airbag 12, a container 14 for accommodating the airbag 12 in a folded state, a gas generator 16 for inflating the airbag 12, and pressure sensors 18 for detecting an internal pressure of the airbag 12 when the airbag 12 is inflated. An airbag-inflation opening (not shown) is disposed in a top surface of the container 14, and a lid (not shown) covers the opening. When the airbag 12 is inflated, the lid starts opening, thereby opening the airbag-inflation opening. A top surface of the lid is flush with the top surface of the instrument panel 1.

As shown in FIG. 3(b), the airbag 12 is inflated in a space defined by the instrument panel 1, the windshield 2, and a passenger, so that a passenger-facing surface 12c receives the passenger. Reference numerals 12d and 12e denote left and right side portions of the airbag 12 in an inflated state.

A gas inlet (not shown) is formed near a rear end of the airbag 12 in a direction of the inflation. A peripheral edge of the gas inlet is connected to the airbag-inflation opening of the container 14. The gas generator 16 is disposed in the container 14. As shown in FIG. 1, the gas generator 16 has a rod shape, and is disposed in the container 14 so that a longitudinal direction thereof is aligned in the width direction of the vehicle.

The pressure sensors 18 are mounted to an inner surface of a side portion 12d of the airbag 12 at an inside center of the vehicle. In the embodiment, two pressure sensors 18 are mounted at different locations in the vertical direction.

The pressure sensors 18 are disposed at locations sufficiently away from a gas inlet and a front portion 12c of the airbag 12, respectively. Accordingly, it is possible to reduce influences from gas flow introduced into the airbag 12 from the gas generator 16 and an impact of the passenger plunging into the front portion 12c of the airbag 12. In addition, the locations of the pressure sensors 18 are away from a bottom portion 12a and a top portion 12b of the airbag as well. Accordingly, it is possible to reduce influences from an impact of the bottom portion 12a contacting the instrument panel 1 and an impact of the top portion 12b contacting the windshield 2.

In the embodiment, each of the pressure sensors 18 is disposed at an intermediate location between the gas inlet and the passenger-facing surface 12c of the airbag 12 or closer to the passenger than the intermediate location.

An end of a harness 18a is connected to each of the pressure sensors 18. The harness 18a is routed or led along the inner surface of the side portion 12d of the airbag 12, and extends from the pressure sensors 18 towards the rear end of the airbag 12. Reference numeral 18b denotes a fastener for fastening the harness 18a to the inner surface of the side portion 12d of the airbag. The other end of the harness 18a is drawn into the container 14 through the gas inlet. A middle portion of the harness 18a is routed along a folding portion of the airbag 12 (a folding line L described later). A process of folding the airbag 12 will be described later.

A vent hole (not shown) is disposed in a wall surface of the container 14 for discharging gas in the inflated airbag 12 to outside. A closing member is provided for closing the vent hole until an internal pressure of the airbag 12 reaches a predetermined value. The closing member is provided with an automatic opening-and-closing mechanism. The automatic opening-and-closing mechanism is provided with a controller for automatically opening and closing the closing mechanism based on detected values from the pressure sensors 18. The other end of the harness 18a is connected to the controller.

The airbag 12 is folded and accommodated in the container 14, and the lid is mounted to the airbag-bulging opening of the container 14, thereby constituting the airbag device 10.

A process of folding the airbag 12 will be described next. In the process of folding the airbag 12, first, as shown in FIG. 2, the left and right side portions 12d and 12e of the airbag 12 are folded in zigzag forms along the folding lines L arranged with an interval in the forward-and-backward direction of the airbag 12, so that a vertically elongated primary-stage folded member is formed. At this time, the airbag 12 is folded so that one folding line L passes on the pressure sensors 18 or near the pressure sensors 18.

As mentioned above, the harness 18a connected to the pressure sensors 18 is routed along the folding lines L. More specifically, the harness 18a extends between the pressure sensors 18 along the folding line L passing on the pressure sensors 18. The harness 18a extends towards the rear end of the airbag 12, and changes a direction perpendicularly to extend along another folding line L adjacent to the previous folding line L. Then, the harness 18a successively changes a direction in a zigzag form and extends toward the rear end of the airbag 12 along another adjacent folding line L, thereby drawing out into the container 14 from the gas inlet. Then, the primary-stage folded member is folded from top and bottom ends towards the airbag-inflation opening of the container 14, thereby forming a final-stage folded member. The final-stage folded member is accommodated in the container 14 from the airbag-inflation opening.

In the airbag device 10 having such a structure, when the vehicle collides, the gas generator 16 ejects gas. The gas from the gas generator 16 inflates the airbag 12 in front of the passenger for receiving the passenger as shown in FIG. 3(b).

When the pressure sensors 18 detect the internal pressure of the airbag 12 above a predetermined value, the automatic opening-and-closing mechanism of the closing member is operated to open the vent hole. The gas in the airbag 12 is discharged from the vent hole in order to absorb an impact. On the other hand, when the internal pressure of the airbag 12 is below the predetermined value, the automatic opening-and-closing mechanism closes the vent hole, thereby preventing an excessive reduction in the internal pressure of the airbag 12. Incidentally, the automatic opening-and-closing mechanism may have a desired mechanism, such as Japanese Patent Publication No. 2003-34222 (EP 1279574A1). The structure of the automatic opening-and-closing mechanism disclosed in Japanese Patent Publication No. 2003-34222 is incorporated herein.

In the airbag device 10, the pressure sensors 18 are disposed on the inner surface of the airbag 12. Accordingly, high-speed air flow from the gas generator 16 does not affect the pressure sensors 18, and the pressure is detected with high precision.

In the airbag device 10, the pressure sensors 18 are disposed on the side portion 12d of the airbag 12 at the locations where the airbag 12 does not contact the passenger and the vehicle body including the instrument panel 1, the windshield 2, and side surfaces in the vehicle. Therefore, when the airbag 12 contacts the passenger or the vehicle body, the pressure sensors 18 are not subjected to, for example, shock, vibration, or pressure, thereby eliminating damage of the pressure sensors 18 and a variation in the detected pressure.

In the embodiment, the harness 18a connected to the pressure sensors 18 is routed or led along the inner surface of the side portion 12d of the airbag 12. Accordingly, the harness 18a does not interfere when the airbag 12 is folded, so that the airbag 12 is properly folded. In addition, the harness 18a moves in accordance with the airbag 12, so that excessive stress is not exerted upon a localized portion of the harness 18a.

In the embodiment, the middle portion of the harness 18a is routed along the folding portion (folding line L) of the airbag 12. In general, a slight gap is formed along the folding portion of the airbag 12. Accordingly, the harness 18a is disposed in such a gap, and the airbag 12 does not become bulky.

In the embodiment, two pressure sensors 18 are disposed on the inner surface of the side portion 12d of the airbag 12 at different locations in the vertical direction. The number of the pressure sensors, an arrangement and the like are not limited to the embodiment. The process of folding the airbag 12 and the method of routing the harness 18a connected to the pressure sensors 18 are not limited to those in the embodiment.

Figure 4:
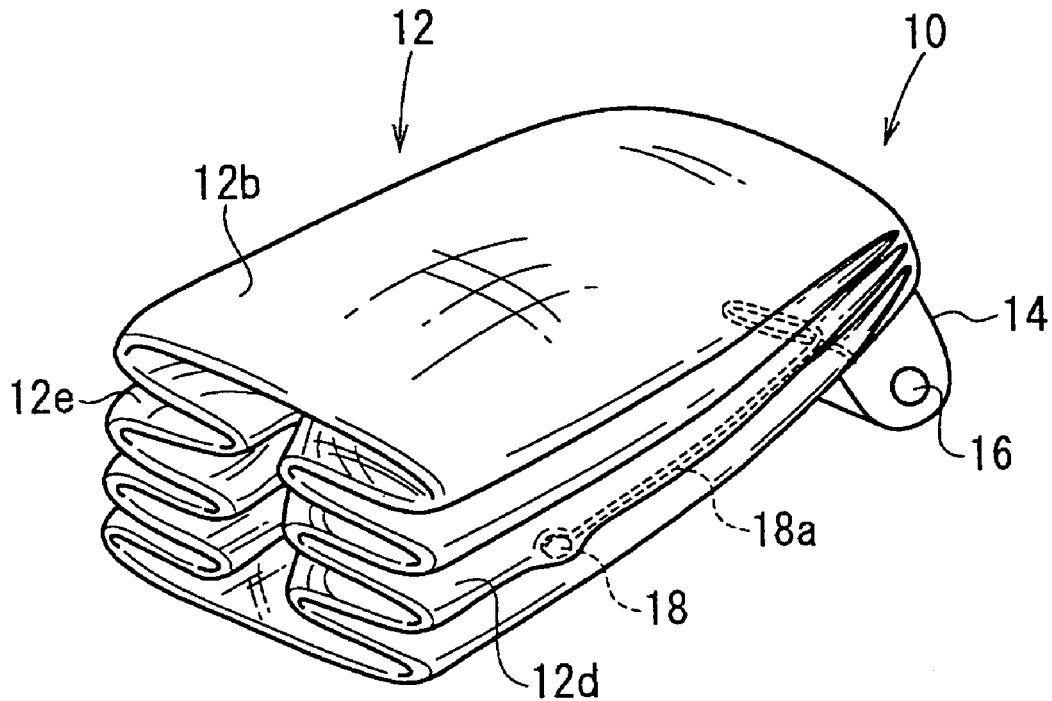
FIG. 4 is a perspective view of an airbag in a folded state and a harness disposed in the airbag according to another embodiment of the invention.

Alternatively, as shown in FIG. 4, when the airbag 12 is folded, first, the left and right side portions 12d and 12e of the airbag 12 are folded in a zigzag form along a plurality of folding lines (not shown) arranged with an interval in the vertical direction of the airbag 12, so that the primary-stage folded member extending in the forward-and-backward direction is formed.

In this embodiment, the pressure sensors 18 are disposed at locations where one of the folding lines passes or close thereto. The harness 18a connected to the pressure sensors 18 is routed along the folding line toward the rear end of the airbag 12.

The other structural features of the embodiment are the same as those of the embodiment shown in FIGS. 1 to 3(b). Accordingly, reference numerals same as those in FIGS. 1 to 3(b) denote corresponding parts shown in FIG. 4.

Figure 5:
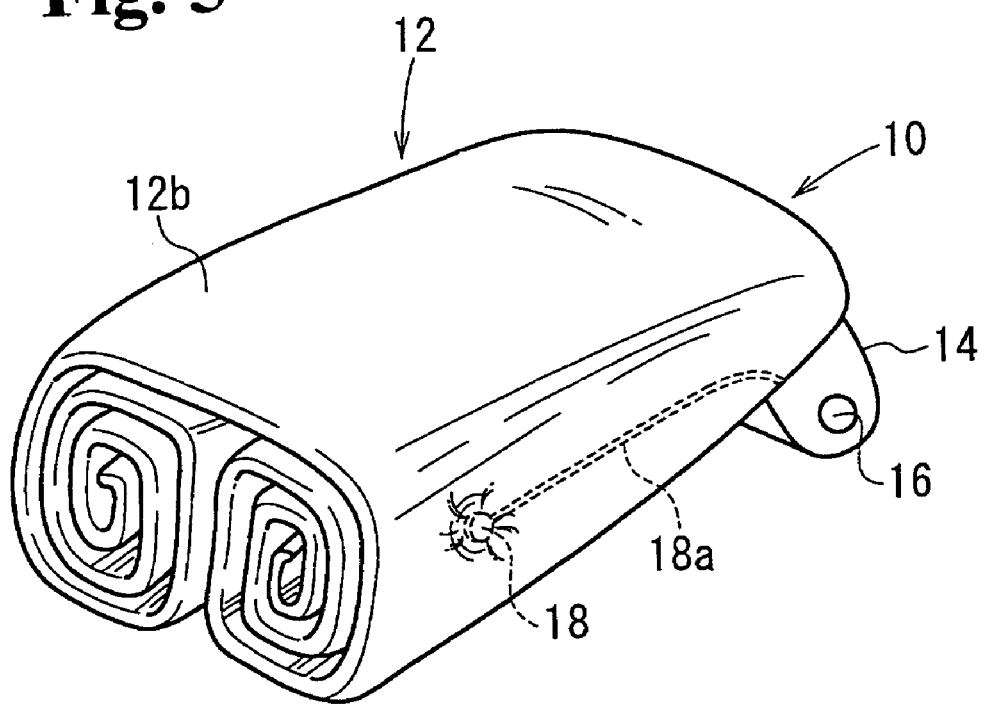
FIG. 5 is a perspective view of an airbag in a folded state and a harness disposed in the airbag according to still another embodiment of the invention.

In FIG. 5, in folding the airbag 12, first, the airbag 12 is spread in a flat form toward a left end and a right end thereof. The left end and the right end are rolled leftwards and rightwards, respectively, toward the center, so that the primary-stage folded member extending in the forward-and-backward direction is formed.

In this embodiment, the pressure sensors 18 are not disposed at the folding line of the airbag 12. The pressure sensors 18 are disposed on the inner surface of a substantially flat portion, i.e. an outermost portion, of the primary-stage folded member. The harness 18a connected to the pressure sensors 18 is routed along the inner surface of the substantially flat portion, i.e. an outermost portion, of the primary-stage folded member.

The other structural features of this embodiment are the same as those of the embodiment shown in FIGS. 1 to 3(b).

Figure 6:
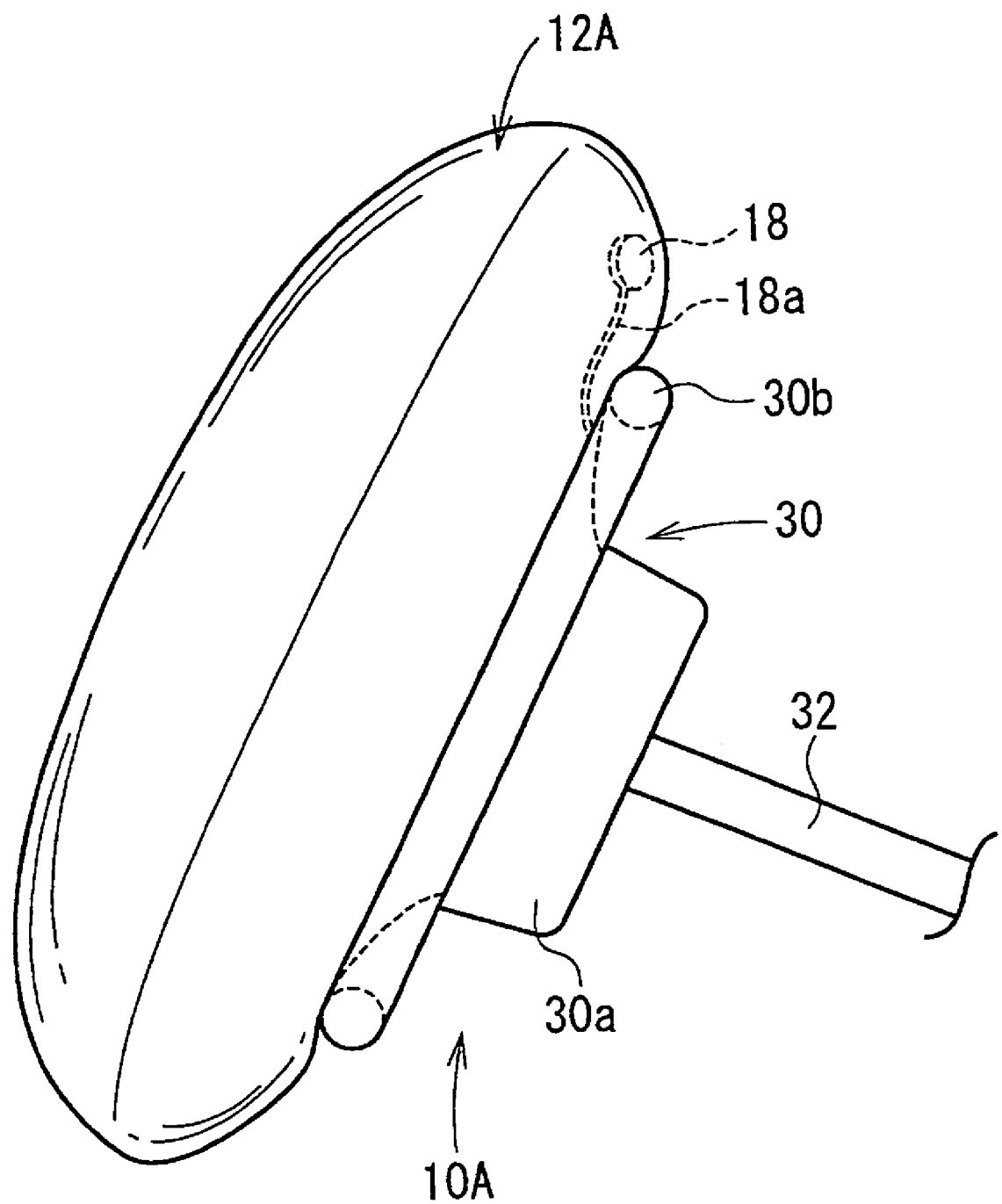
FIG. 6 is a side view of an airbag device according to a further embodiment of the invention.

FIG. 6 is a side view of an airbag device of another embodiment of the present invention. In this embodiment, an airbag device 10A is mounted to a steering wheel 30. Reference numeral 32 denotes a steering column to which the steering wheel 30 is mounted. The airbag device 10A comprises a circular airbag 12A to be inflated for covering a front surface of the steering wheel 30. A hub 30a of the steering wheel 30 has a box-shape with a front opening. The inflated airbag 12A is attached to the hub 30a through a retainer (not shown) at a center of a rear portion thereof. The retainer is provided with a gas generator (not shown) for inflating the airbag 12A. When the airbag 12A is inflated with the gas from the gas generator, a peripheral edge of the airbag 12A extends outwardly over a rim 30b of the steering wheel 30.

The pressure sensor 18 is mounted to the peripheral edge of the airbag 12A on an inner surface of the rear portion of the airbag 12A where the driver does not face. The harness 18a connected to the pressure sensor 18 is disposed along the inner surface of the airbag 12A.

In the airbag device 10A, the airbag 12A is folded and accommodated in the hub 30a, and a module cover (not shown) is mounted to the front side of the hub 30a so as to cover the airbag 12A. When the vehicle collides, the gas generator ejects gas to inflate the airbag 12A for covering the front surface of the steering wheel 30, so that the airbag 12A receives and protects the driver.

In the airbag device 10A, the pressure sensor 18 is disposed on the inner surface of the side peripheral edge of the airbag 12A. Accordingly, high-speed air flow from the gas generator does not affect the pressure sensor 18, and the pressure is detected with high precision.

In the airbag device 10A, the pressure sensor 18 is disposed on the peripheral edge of the airbag 12A, so that the pressure sensor 18 does not contact the driver and the vehicle body including the steering wheel 30. Therefore, when the airbag 12A contacts the driver or the vehicle body, the pressure sensor 18 is not subjected to shock, vibration, pressure, and the like, thereby eliminating damage on the pressure sensor and a variation in the detected pressure.

In this embodiment, the harness 18a connected to the pressure sensor 18 is routed or led along the inner surface of the airbag 12A. Accordingly, the harness 18a does not interfere when the airbag 12A is folded, so that the airbag is properly folded. In addition, the harness 18a moves in accordance with the airbag 12A, thereby eliminating excessive stress applied upon a localized portion of the harness 18a.

The embodiments represent preferred forms of the present invention, so that the present invention is not limited to these embodiments. For example, in the embodiments, the present invention is applied to the airbag and the airbag device for a passenger and a driver in a vehicle. Alternatively, the present invention may be applied to an airbag and airbag device for various other purposes.

As described in detail above, according to the present invention, it is possible to provide the airbag and the airbag device in which the internal pressure is detected with high precision.

While the invention has been explained with reference to the specific embodiments of the invention, the explanation is illustrative and the invention is limited only by the appended claims.

What is claimed is:

1. An airbag for protecting an occupant, comprising;
   a bag portion having a front portion for facing the occupant, a top portion, a bottom portion, and two side portions located between the top and bottom portions and arranged generally perpendicular to the front portion,
   a pressure sensor for detecting an inner pressure of the bag portion when the airbag is inflated, said pressure sensor being mounted on an inner surface of one of the side portions where the pressure sensor is not affected by the occupant and a vehicle body upon inflation of the bag portion, and
   a harness electrically connected to the pressure sensor, said harness having a portion disposed on the inner surface of the bag portion and extending along a folding line when the bag portion is folded.

2. An airbag according to claim 1, wherein a plurality of pressure sensors is disposed in one bag portion.

3. An airbag device comprising the airbag according to claim 1, and a gas generator attached to the airbag for inflating the same.

4. An airbag according to claim 2, wherein said plurality of pressure sensors is disposed on the inner surface of one of the side portions and is arranged to be vertically spaced apart from each other.

5. An airbag according to claim 4, wherein the pressure sensors are disposed at an intermediate location between the front portion and a gas inlet of the bag portion, and the harness is attached to the inner surface by a fastener.

6. An airbag device comprising the airbag according to claim 5, a container, and a gas generator attached to the airbag and retained in the container, wherein said airbag further includes the gas inlet, through which the harness inside the airbag extends to the container.

* * * * *